United States Patent
Dhiman et al.

(10) Patent No.: US 7,325,100 B2
(45) Date of Patent: Jan. 29, 2008

(54) APPARATUS AND METHOD FOR ENTERING AND EXITING LOW POWER MODE

(75) Inventors: Gaurav Dhiman, New Delhi (IN); Gaurav Kapoor, Moradabad (IN)

(73) Assignee: STMicroelectronics Pvt. Ltd. (IN)

( * ) Notice: Subject to any disclaimer, the term of this patent is extended or adjusted under 35 U.S.C. 154(b) by 104 days.

(21) Appl. No.: 11/264,301

(22) Filed: Oct. 31, 2005

(65) Prior Publication Data

US 2006/0253716 A1 Nov. 9, 2006

(30) Foreign Application Priority Data

Oct. 29, 2004 (IN) ........................ 2155/DEL/2004

(51) Int. Cl.
*G06F 12/00* (2006.01)
*G06F 1/32* (2006.01)

(52) U.S. Cl. ........................ 711/137; 711/106; 711/165; 713/320; 713/323; 713/330

(58) Field of Classification Search ................ 711/105, 711/106, 137, 165; 713/300–340
See application file for complete search history.

(56) References Cited

U.S. PATENT DOCUMENTS 5,931,951 A * 8/1999 Ando ......................... 713/324
6,122,748 A * 9/2000 Hobson ...................... 713/323
6,571,333 B1    5/2003 Jain et al.

* cited by examiner

*Primary Examiner*—Jack Lane
(74) *Attorney, Agent, or Firm*—Lisa K. Jorgenson; Bryan Santarelli; Graybeal Jackson Haley LLP

(57) ABSTRACT

An apparatus for entering and exiting low power mode comprising a processor having a cache; a power management mechanism connected to said processor for controlling a plurality of power management states, at least one of said power management states being a low latency low power state; a memory subsystem including a self sustaining mechanism connected to said processor for retaining data during said low power state; a pre-fetching routine in said memory subsystem for loading instructions into a cache prior to entering said low power state; a disabling mechanism in said processor for disabling any interrupts that may disturb said pre-fetched instructions; an enabling routine in said memory subsystem for initiating the self sustaining operation of said memory subsystem; a detecting routine connected to said processor for sensing a trigger to exit from said low power state; and a restoring routine in said power management mechanism for restoring the clock of said apparatus; thereby said processor disabling said self sustaining operation and resuming normal operation at the end of said low power state.

7 Claims, 5 Drawing Sheets

APPARATUS AND METHOD FOR ENTERING AND EXITING LOW POWER MODE

PRIORITY CLAIM

This application claims priority from Indian Patent Application No. 2155/Del/2004, filed Oct. 29, 2004, which is incorporated herein by reference.

FIELD OF THE INVENTION

Embodiments of the present invention relate to an apparatus and method for entering and exiting low-power mode.

BACKGROUND

In recent times there has been a significant increase in the number of battery-driven handheld devices. Unfortunately, the battery technology has not advanced as fast as the technology of the power-hungry hardware that runs these devices. Thus, the batteries of portable and mobile devices tend to discharge relatively quickly and, hence, power management is a key consideration in the design of such devices. Low power consumption is a major system-level design issue that typically cannot be added to an existing system later on. Rather, it is accounted for in a system's hardware and software by using energy-saving components and implementing dynamic power-management techniques.

The processors used in these devices thus support many operational modes that have different performance and power consumption characteristics. One such low-power state can be a SLEEP state wherein the clocks of the system are stopped. In this state the system is completely idle and the context of the system is retained, including the contents of the CPU registers, caches, peripheral registers and RAM. Implementing dynamic power-management techniques involve entering and exiting these low-power modes whenever feasible.

The memory used in the computer system is normally a synchronous dynamic random access memory (SDRAM) since it is faster than extended data out random access memory (EDO DRAM), fast page mode (FPM) DRAM, or another type of dynamic random access memory (DRAM). Static random access memory (SRAM) is faster and more reliable than DRAM but unfortunately is also much more expensive than DRAM.

All these types of DRAM need to be periodically refreshed in order to maintain the data values stored in them. Some types of DRAM, including SDRAM, are able to execute self-refresh cycles. In a self-refresh cycle, the DRAM uses an internal clocking to refresh itself, and no external clocks are required. Once the DRAM is placed into the self-refresh mode using a self-refresh command, the system clock may be turned off without affecting the contents. However, during the period when the DRAM is in self-refresh mode no accesses can be made to it.

FIG. 1 illustrates the problem associated with entry and exit from the SLEEP mode due to the restriction that no accesses to the SDRAM 3 can be made when it is in self-refresh mode. Before entry into the SLEEP mode, the SDRAM 3 is put in the self-refresh mode. But the entire code itself resides in the SDRAM 3. Thus, once the code 4 that puts the SDRAM 3 in self-refresh gets executed, the subsequent code 5 cannot be executed since no SDRAM 3 accesses are permitted in self-refresh mode.

FIG. 2 illustrates the solution to this problem as proposed by U.S. Pat. No. 6,571,333 by making use of a second (non-volatile) memory 10. This second memory 10 stores the code instead of the SDRAM 9 to put the SDRAM 9 into self-refresh and then the chip 6 in SLEEP mode. Thus, the use of this second memory 10 avoids accesses to the primary SDRAM 9 after putting it in self-refresh.

In this existing solution the SLEEP entry and exit code (called System Management Software or SMM) is placed in the second memory 10 and the control to SMM is transferred through a change in address mapping (PAM register) and a System Management Interrupt (SMI). Moreover, since the code from a second memory 10 puts the SDRAM 9 in self-refresh, cache 8 needs to be flushed before enabling SDRAM 9 self-refresh to avoid write-backs to SDRAM 9 due to cache 8 eviction. This is done in spite of the fact that cache 8 contents are preserved during the SLEEP (defined as S1 in the solution) mode. All these activities have a clear overhead associated with them.

In the proposed solution, the aforesaid problems relating to the entry and exit from SLEEP state are being dealt with. An embodiment of the invention uses cache pre-fetching of a certain set of instructions and the associated data, which are to be definitely executed thereby avoiding any accesses to the SDRAM while it is in self-refresh. The solution obviates the need of a second memory and the need of cache flushing for SLEEP entry and exit purpose. The code is built-in as a small library into the operating system and SLEEP entry and exit is reduced to a simple function call to the appropriate routine.

SUMMARY

To remove the aforementioned problems, an embodiment of the invention provides a method for power management in a processing system during the entry and exit of a low-power state.

Another embodiment of the invention obviates the need of second memory by using a cache for pre-fetching the instructions for the entry and exit from a low-power state.

Further embodiment of the invention avoids cache-flushing which decreases the latency of entering low-power state.

To achieve the aforesaid solutions, an embodiment of the invention provides a processing system for entering and exiting low-power mode comprising:

a. a processor having a cache;
   b. a power-management means connected to said processor for controlling a plurality of power-management states, at least one of said power-management states being a low-latency low-power state;
   c. a memory subsystem including a self-sustaining mechanism connected to said processor for retaining data during said low-power state;
   d. a pre-fetching means in said memory subsystem for loading instructions into a cache prior to entering said low-power state;
   e. a disabling mechanism in said processor for disabling any interrupts that may disturb said pre-fetched instructions;
   f. an enabling means in said memory subsystem for initiating the self-sustaining operation of said memory subsystem;
   g. a detecting means connected to said processor for sensing a trigger to exit from said low-power state; and
   h. a restoring means in said power management mechanism for restoring the clock of said apparatus;

thereby said processor disabling said self-sustaining operation and resuming normal operation at the end of said low-power state.

The said memory subsystem may be SDRAM.

The said memory subsystem may be DRAM.

The said memory subsystem may be RDRAM.

The said detecting means may be a Clock and Power Controller, which monitors the general-purpose input output pins connected to the external world, to detect said wakeup trigger.

In a processing system comprising a processor, a cache and a memory subsystem, an embodiment of the invention provides a method for entering and exiting low-power mode comprising the steps of:

a. controlling a plurality of power-management states, at least one of said power-management states being a low-latency low-power state;

b. pre-fetching the instructions from memory subsystem to said cache prior to entering low-power state;

c. disabling any interrupts that may disturb said pre-fetched instructions;

d. executing said instructions for putting memory in self-sustaining mode and subsequently putting said processing system in low-power state;

e. detecting a trigger to exit from said low-power state; and f. disabling self-sustaining operation and resuming normal operation at the end of said low-power state.

The said pre-fetching may be carried out using the privileged instructions of said processor for deliberately pre-fetching said instructions into said cache.

The SLEEP state is defined as a low wakeup latency sleeping state. In this state no system context is lost (CPU or chip set), and the hardware is responsible for maintaining all system context, which includes the context of the CPU, caches, memory, and all chipset I/O. Many modern processors, including ST's Nomadik, support it.

In a sample SLEEP state implementation, the processor is placed into the stop-grant state. Once the processor's input clock is stopped, the processor is placed into the stop-clock state. It places the system memory into a self-refresh or suspend-refresh state. The self-refresh operation is maintained by the memory itself or through some other reference clock that is not stopped during the sleeping state. All the system clocks are stopped (asserts the standby signal to the system PLL chip) while the clocks for RTC and wakeup trigger detection unit (Clock and Power Controller) may continue running.

In an embodiment of the invention, all clocks in the system have been stopped. Hardware reverses the process (restarting system clocks) upon any enabled wakeup event.

BRIEF DESCRIPTION OF THE DRAWINGS

Embodiments of the invention will now be explained with reference to the accompanying drawings.

DETAILED DESCRIPTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
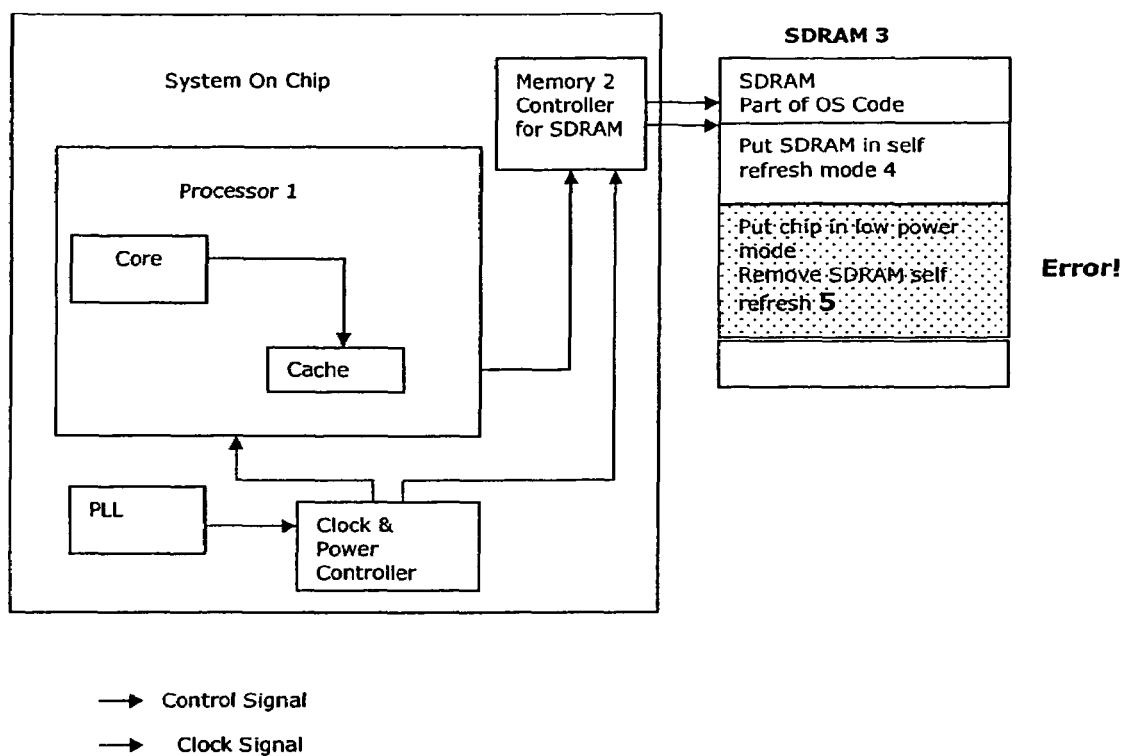
FIG. 1 illustrates the entry and exit problem.
Figure 2:
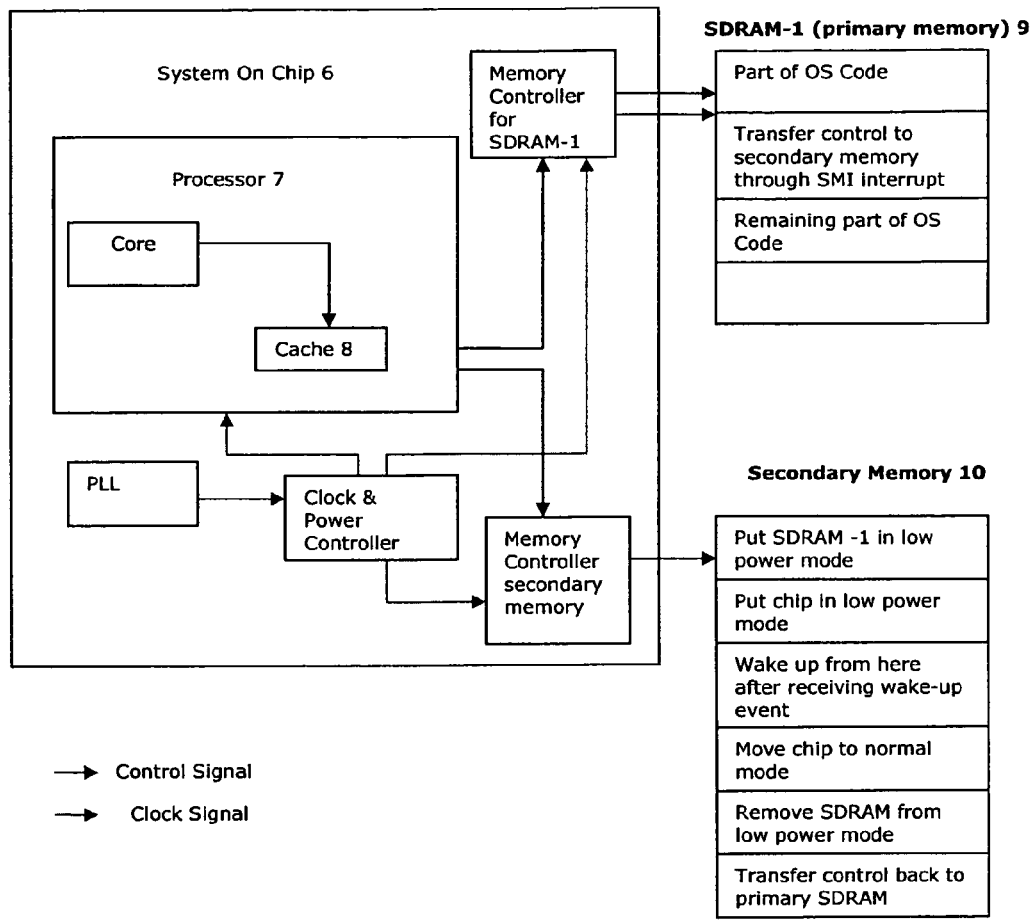
FIG. 2 shows the U.S. Pat. No. 6,571,333 solution.
Figure 3:
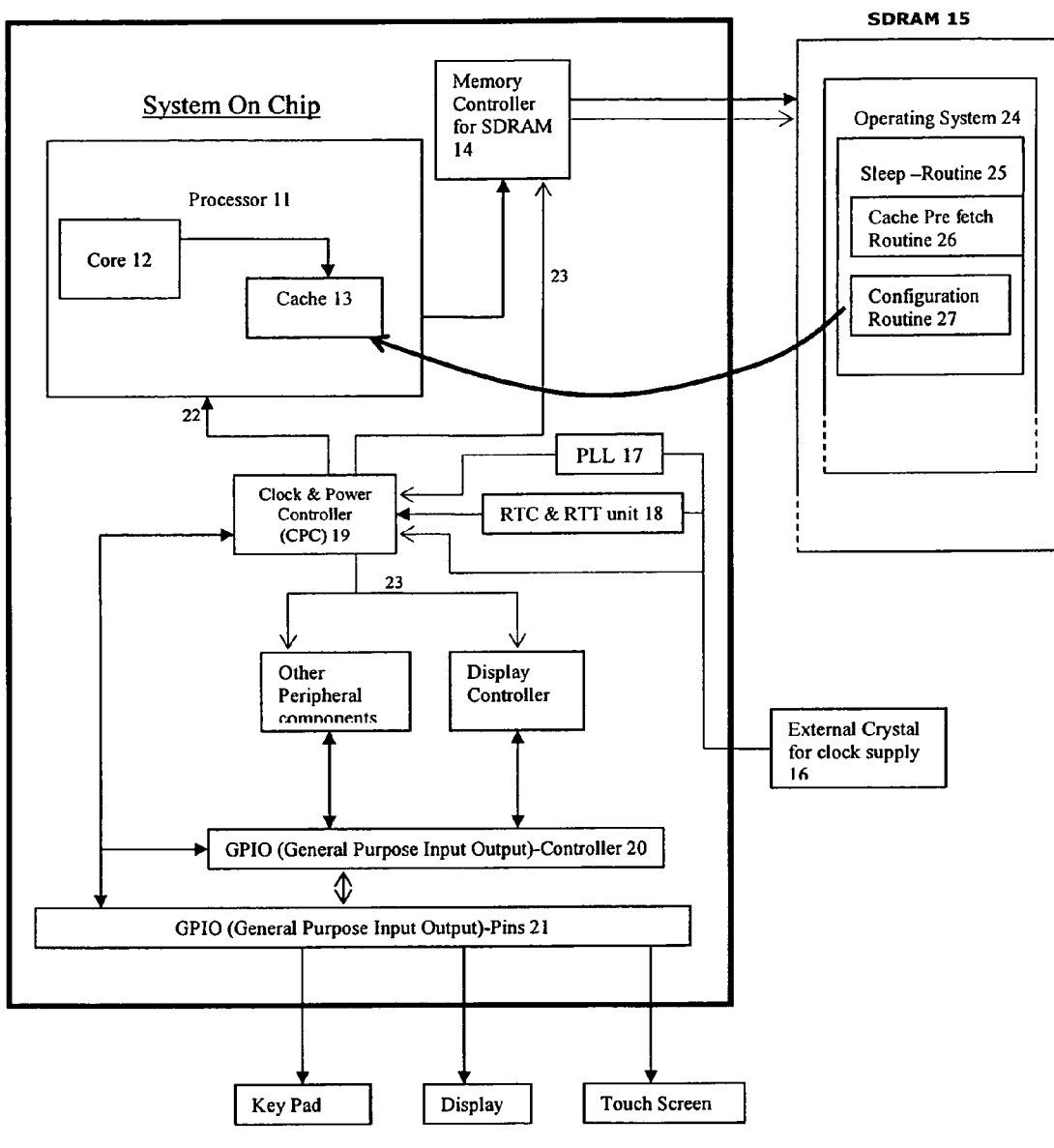
FIG. 3 shows a solution in accordance with an embodiment of the invention.

As shown in FIG. 3, a processor 11 is connected to a memory controller 14. The processor may be an ARM processor or any other general-purpose processor that includes a cache 13 to speed up memory access time. The cache 13 may be a separate Instruction and Data cache or a unified cache. Memory controller 14 is connected to, and controls, main memory 15. Main memory 15 can be a SDRAM memory chip.

The memory controller 14 acts as an interpreter between the RAM bus and processor 11 so that the processor 11 does not need to concern itself with the details of the RAM structure or operation. Other high-speed RAM technologies using a memory controller to access main memory 15 may be used as well.

An external crystal oscillator 16 provides clock to the chip. This clock drives a Real Time Clock (RTC) and Real Time Timer (RTT) unit 18, a Phase-Lock Loop (PLL) 17 and a Clock and Power Controller (CPC) 19. The PLL 17 provides higher-frequency clocks to the CPC 19, which feeds it to the rest of the system. The memory controller 14 and main memory 15 are clocked by memory clock 23. The processor 11 is clocked by processor clock 22.

Apart from delivering clocks to the rest of the system, CPC 19 governs all the power state transitions. CPC 19 is interfaced with a General Purpose Input Output (GPIO) controller 20 and the GPIO pins 21 for programming the wake-up events before entering the SLEEP mode. In the SLEEP mode, the CPC 19 is programmed to control the GPIO pins 21 for detecting the wake-up event since the GPIO pins 21 are the interface of the chip to the external world where all the external events arrive.

The main memory 15 stores the entire Operating System (OS) 24. A SLEEP routine 25 is a part of the OS 24 and comprises a cache pre-fetch routine 26 and configuration routine 27 used to initialize the memory controller 14 and to enter SLEEP mode. Since SLEEP routine 25 is a part of the OS, it resides in the main memory 15. The cache pre-fetch routine 26 pre-fetches the configuration routine 27 into the cache 13 of the processor 11.

In the awake state, the system runs normally. The memory controller 14 is initialized and portions of OS 24 are loaded into the main memory 15.

Figure 4:
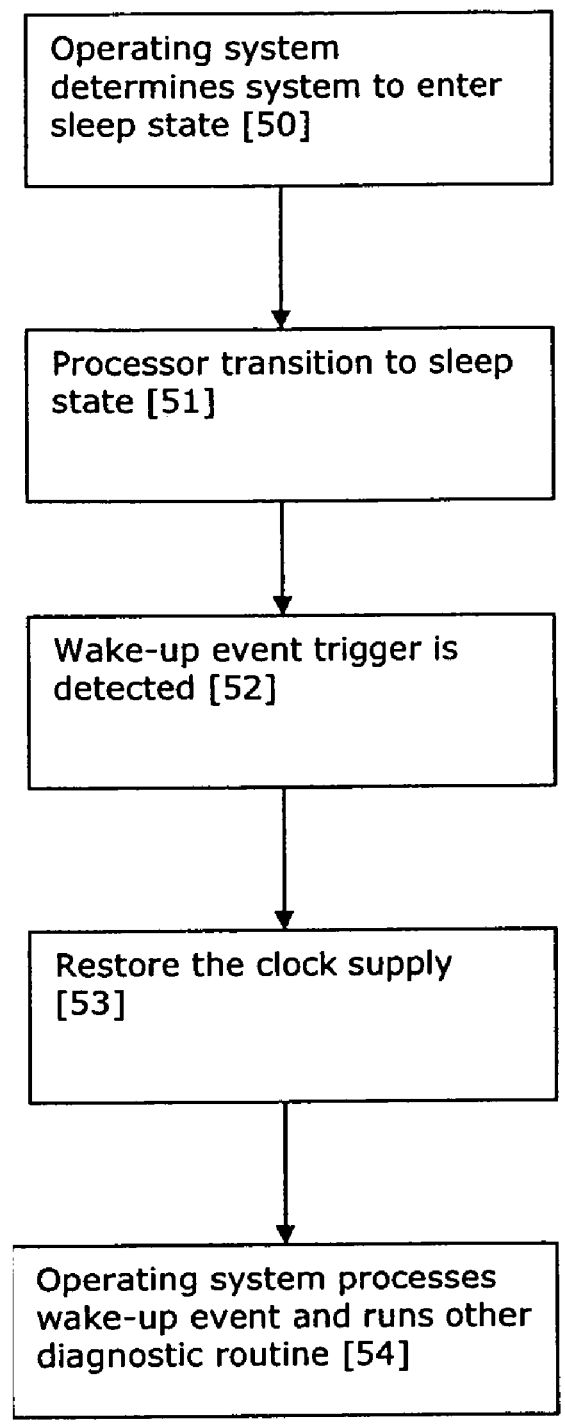
FIG. 4 shows a flowchart broadly depicting the state transitions involved in an embodiment of the invention.

FIG. 4 shows a flowchart broadly detailing the entry and exit of a SLEEP state according to an embodiment of the invention. As shown in the figure in step 50, the operating system may determine that power should be conserved and that the system should enter the SLEEP state. This determination can be a result of a number of factors, such as a system idle time-out, a user request, such as a user pressing a "suspend" or "standby" key, a request from a hardware device, such as a low battery, or a request from an application program. OS 24 invokes the SLEEP routine 25 to accomplish the transition into the SLEEP state.

In step 51, the processor transitions to the SLEEP state. It is accomplished by programming the CPC 19. Processor clock 12 and the clocks to the rest of the peripherals 23 are removed. Since the main memory 15 is in self-refresh mode the contents are preserved. In the SLEEP state, physical power is not removed.

In step 52, a wake event trigger is detected. This trigger signals that the processor 11 should resume normal operation. In some applications, this may be a return to full speed, full power mode. In other applications, the system may awaken to a more drowsy state where processor 11 may not be running at full speed and is later configured to run at full speed. The wake event trigger may be generated by a source outside the system itself, such as a user pressing a "power on" or "resume" key, an incoming call signal from a modem or other telephony receiver, or it may be generated by a timer tied to a particular time of day or some other timer such as for scheduled system maintenance.

In response to the detected wake event trigger, in step 53 the CPC 19 restores the clock supply 16 to the system. The system configures the memory controller 14 to remove the self-refresh. This configuration involves executing configuration routine 27.

After memory controller 14 is initialized, in step 54 the configuration routine 27 returns. OS 24 processes the wake event trigger. This processing can include performing a quick system diagnostic, or other routine typically executed following a wake event.

Figure 5:
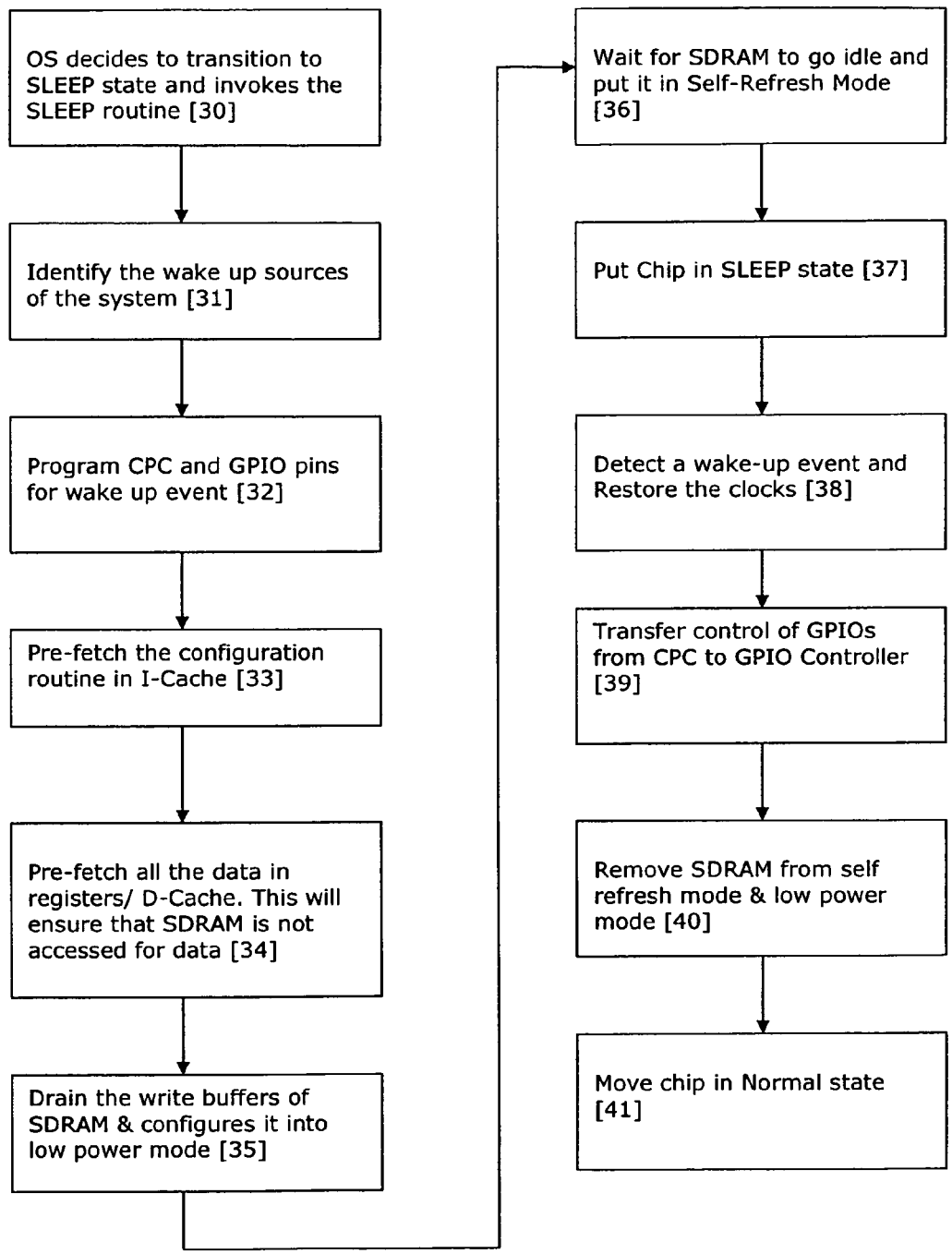
FIG. 5 shows a flowchart in accordance with an embodiment of the invention.

FIG. 5 shows a flowchart implementing the SLEEP state with SDRAM 15 according to an embodiment of the invention. In normal operation, setting the sleep-enable bit in CPC 19 will cause the processor to transition to the SLEEP state. In step 30, the SLEEP routine 25 is invoked by the OS 24 to enter the SLEEP state after disabling all the interrupts.

In step 31, the SLEEP routine 25 first identifies the possible wake-up sources. The wake-up source can be a user interface event, such as a keypad or touch screen event, a timer event aimed at performing certain system maintenance after a definite period or an alarm on the RTC 18. For an outstanding alarm, the RTC hardware 18 should already be configured to generate the interrupt. For all the other sources there is an associated GPIO pin, which is programmed accordingly to wake-up the system. During SLEEP mode, the interrupts are disabled and the CPC 19 is in control of the GPIO pins 21. All the peripherals in the system have an associated GPIO pin. Hence in step 32, the CPC 19 is programmed to enable any peripheral, such as a keypad or touch screen, and the associated GPIO pin to wake-up the system. Once enabled as the wake-up source, the specific GPIO pins are monitored by the CPC 19 in the SLEEP mode for wake-up trigger detection.

Thereafter in step 33, the SLEEP routine 25 invokes the cache pre-fetch routine 26 which pre-fetches the entire configuration routine 27 into the cache 13. The routine uses the privileged instructions of the processor (co-processor instructions in case of ARM) to deliberately pre-fetch the entire configuration routine 27 into the cache 13. Apart from the instructions, the data items stored in the SDRAM 15, which are accessed by these instructions, are either stored in the processor's 11 general-purpose register or are ensured to be in cache 13 by making deliberate accesses to them in step 34.

After the cache pre-fetch routine 26, the entry routine 25 invokes the configuration routine 27. In step 35, this routine drains the write buffers of the SDRAM 15 and configures it to low-power mode. In step 36, it waits for the SDRAM 15 to get idle and configures the memory controller 14 to place the SDRAM 15 in self-refresh. Once the SDRAM 15 enters self-refresh, in step 37 the chip is finally placed in SLEEP state by setting the SLEEP enable bit in the CPC 19. During the execution of the configuration routine 27, main memory 15 accesses will never be made since the entire code is already pre-fetched into the cache 13 and all the interrupts are disabled. It is thus guaranteed that once the configuration routine 27 is pre-fetched into the cache 13 using the pre-fetch routine 26, it remains in the cache 13 until normal operation is restored. In effect, it gives an illusion to a naive user that the code is actually running from the main memory 15 since the addresses that are generated map to the main memory 15 only. But since the entire code is pre-fetched in advance in the cache 13, the physical access to the main memory 15 is never made. Hence, the SLEEP entry problem is resolved.

In SLEEP state, the processor clock 22 and SDRAM clock 23 are powered down. In this embodiment, the processor 11 and the main memory 15 each have their own respective clocks. In other embodiments, the processor and memory subsystem can use the same clock as their respective clocks. The clock to the CPC 19 and RTC and RTT unit 18, however, stays powered.

In step 38, a wake event trigger is received and the CPC 19 detects it. The CPC 19 restores the clocks. The processor 11 resumes instruction fetching and the first instruction to be fetched is the instruction from the configuration routine 27 following the transition to the SLEEP state. In step 39, the configuration routine 27 then executes the instructions to restore the control of the GPIO pins 21 to the GPIO controller 20. In step 40, the configuration routine 27 configures the memory controller 14 to remove the SDRAM 15 low-power mode and the self-refresh and blocks until the self-refresh is removed. Again, no SDRAM 15 access is made since this code is pre-fetched in the cache 13. Once the self-refresh is removed, SDRAM 15 accesses can be made as normal and the configuration routine 27 returns to the SLEEP routine 25. In step 41, the SLEEP routine 25 configures the chip to the appropriate power mode and returns. The system has returned successfully from the sleep state and normal operation continues.

Referring to FIG. 3, the system on chip may be disposed in a larger system, such as a computer system.

The disclosed embodiments are exemplary only. The same approach might be used for some other low-power modes as well where the memory is put in self-refresh. Moreover, it can include any self-refreshing dynamic memory. The SLEEP state has been taken as an example for illustrating the approach. Further optimizations of the approach like locking the pre-fetched code into the cache are possible. Such embodiments and optimizations are within the scope and spirit of the invention.

What is claimed is:

1. A processing system for entering and exiting low power mode comprising:

a processor having a cache;

a power management means connected to said processor for controlling a plurality of power management states, at least one of said power management states being a low latency low power state;

a memory subsystem including a self sustaining mechanism connected to said processor for retaining data during said low power state;

a pre-fetching means in said memory subsystem for loading instructions into a cache prior to entering said low power state;

a disabling mechanism in said processor for disabling any interrupts that may disturb said pre-fetched instructions;

an enabling means in said memory subsystem for initiating the self sustaining operation of said memory subsystem;

a detecting means connected to said processor for sensing a trigger to exit from said low power state; and a restoring means in said power management mechanism for restoring the clock of said apparatus;

thereby said processor disabling said self sustaining operation and resuming normal operation at the end of said low power state.

2. The processing system as claimed in claim 1 wherein said memory subsystem is SDRAM.

3. The processing system as claimed in claim 1 wherein said memory subsystem is DRAM.

4. The processing system as claimed in claim 1 wherein said memory subsystem is RDRAM.

5. The processing system as claimed in claim 1 wherein said detecting means is a general purpose input output controller connected to the external world to detect said trigger.

6. In a processing system comprising a processor, a cache and a memory subsystem, a method for entering and exiting low power mode comprising the steps of:

controlling a plurality of power management states, at least one of said power management states being a low latency low power state;

pre-fetching the instructions from memory subsystem to said cache prior to entering low power state;

disabling any interrupts that may disturb said pre-fetched instructions;

executing said instructions for putting memory in self sustaining mode and subsequently putting said processing system in low power state;

detecting a trigger to exit from said low power state; and disabling self sustaining operation and resuming normal operation at the end of said low power state.

7. The method for entering and exiting low power mode as claimed in claim 6 wherein said pre-fetching is carried out using the privileged instructions of said processor for deliberately pre-fetching said instructions into said cache.

* * * * *